US010031708B2

(12) United States Patent
Osaki

(10) Patent No.: US 10,031,708 B2
(45) Date of Patent: Jul. 24, 2018

(54) IMAGE PROCESSING SYSTEM, IMAGE PROCESSING METHOD, AND IMAGE PROCESSING APPARATUS

(71) Applicant: Shohgo Osaki, Tokyo (JP)

(72) Inventor: Shohgo Osaki, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/450,117

(22) Filed: Mar. 6, 2017

(65) Prior Publication Data

US 2017/0262240 A1 Sep. 14, 2017

(30) Foreign Application Priority Data

Mar. 8, 2016 (JP) .................... 2016-044643

(51) Int. Cl.
*G06F 3/12* (2006.01)
*G06K 15/00* (2006.01)

(52) U.S. Cl.
CPC ......... *G06F 3/1261* (2013.01); *G06F 3/1212* (2013.01); *G06F 3/1273* (2013.01); *G06F 3/1286* (2013.01); *G06F 3/1287* (2013.01); *G06F 3/1288* (2013.01); *G06F 2206/1508* (2013.01)

(58) Field of Classification Search
None
See application file for complete search history.

(56) References Cited

U.S. PATENT DOCUMENTS

| 5,287,194 A * | 2/1994 | Lobiondo | .......... G03G 15/5083 |
| | | | 358/1.15 |
| 2004/0190042 A1* | 9/2004 | Ferlitsch | ............ H04N 1/00233 |
| | | | 358/1.15 |

FOREIGN PATENT DOCUMENTS

| JP | 2002-342298 | 11/2002 |
| JP | 2016-024640 | 2/2016 |

* cited by examiner

*Primary Examiner* — Dov Popovici
(74) *Attorney, Agent, or Firm* — Harness, Dickey & Pierce, P.L.C.

(57) ABSTRACT

An image processing apparatus includes: a determiner configured to, upon determining that information processing is not to be performed by the image forming apparatus based on a load status of the image forming apparatus, determine whether or not other image forming apparatuses on a network include an alternative image forming apparatus capable of performing the information processing based on load statuses of the other image forming apparatuses acquired from a server apparatus via the network; and a requester configured to, when the other image forming apparatuses include the alternative image forming apparatus capable of performing the information processing, request the alternative image forming apparatus to perform the information processing, but when the other image forming apparatuses do not include the alternative image forming apparatus capable of performing the information processing, request the server apparatus to perform the information processing.

18 Claims, 8 Drawing Sheets

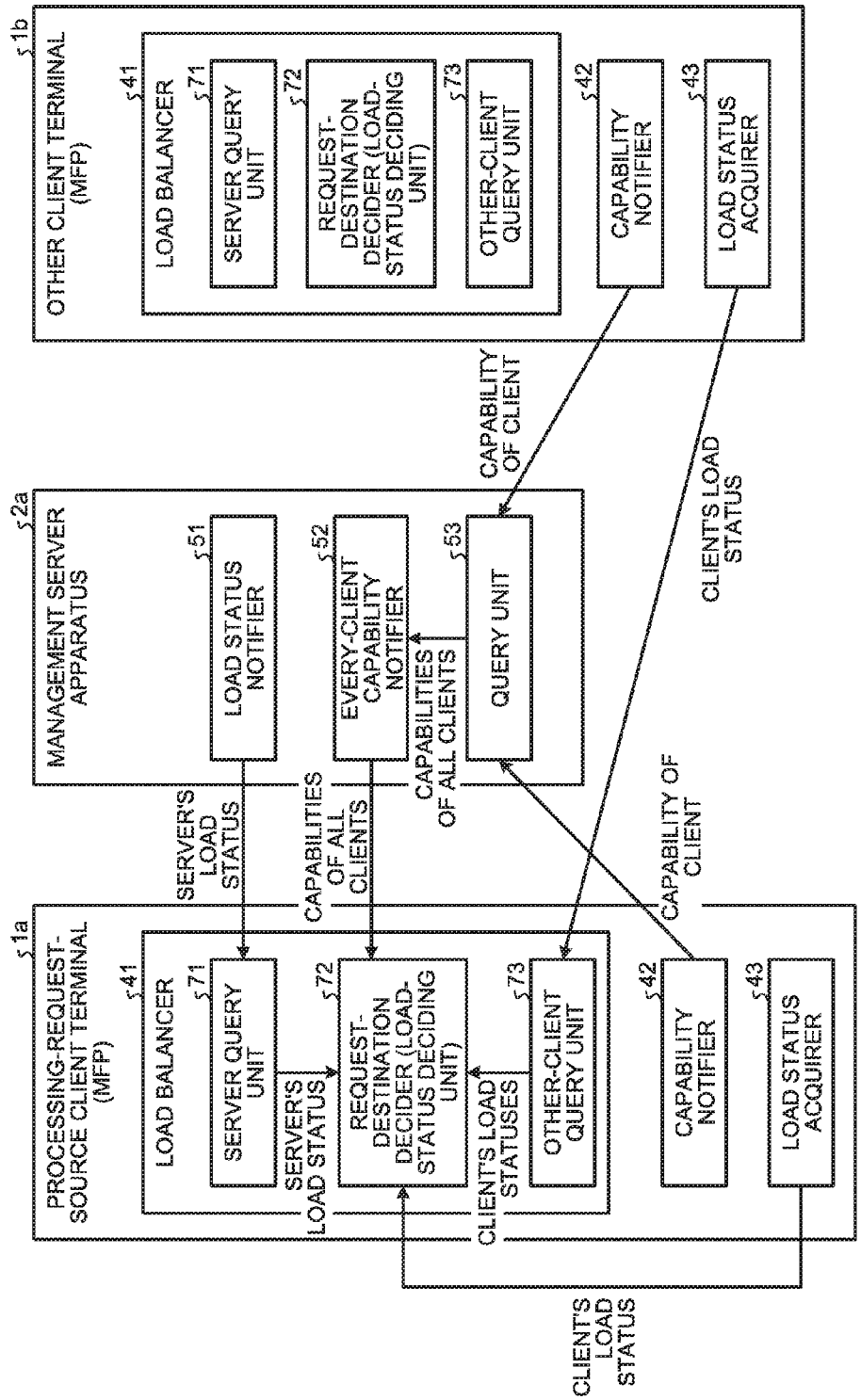

IMAGE PROCESSING SYSTEM, IMAGE PROCESSING METHOD, AND IMAGE PROCESSING APPARATUS

CROSS-REFERENCE TO RELATED APPLICATIONS

The present application claims priority under 35 U.S.C. § 119 to Japanese Patent Application No. 2016-044643, filed Mar. 8, 2016. The contents of which are incorporated herein by reference in their entirety.

BACKGROUND OF THE INVENTION

1. Field of the Invention

The present invention relates generally to image processing systems, image processing methods, and image processing apparatuses.

2. Description of the Related Art

Client/server systems in which a client terminal requests a server apparatus to perform information processing are known today. In the client/server system, load on the server apparatus can increase when the number of requests requesting to perform information processing issued to the server apparatus increases or when the server apparatus performs time-consuming information processing. As the load increases, performance of the server apparatus decreases and, as a result, responsiveness to a request decreases. To reduce load on a server apparatus such as that described above, a technique (load balancing scheme) that involves a plurality of server apparatuses and allocates a request requesting to perform information processing to a lightly-loaded one of the server apparatuses is known.

For example, Patent Document 1 (Japanese Unexamined Patent Application Publication No. 2002-342298) discloses a parallel load balancing scheme. In the parallel load balancing scheme, a client terminal includes a client load balancer. The client load balancer transmits a request requesting to establish a session to an initially-designated server apparatus and selects, based on a response to the session establishment request, a server apparatus that executes a task.

The initially-designated server apparatus includes a server load balancer. Upon receiving the session establishment request from the client load balancer, the server load balancer compares the number of sessions among a plurality of initially-designated server apparatuses to transmit a response to the session establishment request to the client load balancer and manage the numbers of the sessions.

The parallel load balancing scheme described can adjust the load balance among the server apparatuses autonomously.

However, conventional load balancing schemes and the parallel load balancing scheme disclosed in Patent Document 1 adjust load balance among a plurality of server apparatuses by allocating information processing to a lightly-loaded server apparatus of the server apparatuses. Accordingly, even if the load balance is adjusted, when load on each of the server apparatuses increases due to an increase in the number of client terminals, responsiveness of a system, in its entirety, decreases.

Accordingly, when a conventional load balancing scheme or the parallel load balancing scheme disclosed in Patent Document 1 is used, there arises the need for adding a server apparatus(es) to thereby increase the number of entities to which information processing can be allocated, thereby preventing a decrease in responsiveness that would otherwise be caused by an increase in the number of client terminals. Specifically, when a conventional load balancing scheme or the parallel load balancing scheme disclosed in Patent Document 1 is used, the need for adding a server apparatus(es) proportionally to an increase in the number of client terminals arises.

Therefore, there is a need for an image processing system, an image processing method, and an image processing apparatus capable of decreasing load on a server apparatus to which information processing can be allocated.

SUMMARY OF THE INVENTION

According to exemplary embodiments of the present invention, there is provided an image processing system comprising: a plurality of image forming apparatuses; and at least one server apparatus, the image forming apparatuses and the server apparatus being mutually connected via a network, the server apparatus including a manager configured to manage load statuses of the plurality of image forming apparatus, each of the image forming apparatuses including a determiner configured to, upon determining that information processing is not to be performed by the image forming apparatus to which the determiner belongs based on a load status of the image forming apparatus to which the determiner belongs, determine whether or not the other image forming apparatuses include an alternative image forming apparatus capable of performing the information processing based on load statuses of the other image forming apparatuses acquired from the server apparatus, and a requester configured to, when the other image forming apparatuses include the alternative image forming apparatus capable of performing the information processing, request the alternative image forming apparatus to perform the information processing, but when the other image forming apparatuses do not include the alternative image forming apparatus capable of performing the information processing, request the server apparatus to perform the information processing.

Exemplary embodiments of the present invention also provide an image processing method for an image processing system including a plurality of image forming apparatuses and at least one server apparatus, the image forming apparatuses and the server apparatus being mutually connected via a network, the image processing method comprising: determining, by a determiner of the image forming apparatus, upon determining that information processing is not to be performed by the image forming apparatus to which the determiner belongs based on a load status of the image forming apparatus to which the determiner belongs, whether or not the other image forming apparatuses include an alternative image forming apparatus capable of performing the information processing based on load statuses of the other image forming apparatuses acquired from the server apparatus; and requesting, by a requester of the image forming apparatus, when the other image forming apparatuses include the alternative image forming apparatus capable of performing the information processing, the alternative image forming apparatus to perform the information processing, but when the other image forming apparatuses do not include the alternative image forming apparatus capable of performing the information processing, requesting the server apparatus to perform the information processing.

Exemplary embodiments of the present invention also provide an image processing apparatus comprising: a determiner configured to, upon determining that information processing is not to be performed by the image forming apparatus based on a load status of the image forming apparatus, determine whether or not other image forming apparatuses on a network include an alternative image forming apparatus capable of performing the information processing based on load statuses of the other image forming apparatuses acquired from a server apparatus via the network; and a requester configured to, when the other image forming apparatuses include the alternative image forming apparatus capable of performing the information processing, request the alternative image forming apparatus to perform the information processing, but when the other image forming apparatuses do not include the alternative image forming apparatus capable of performing the information processing, request the server apparatus to perform the information processing.

BRIEF DESCRIPTION OF THE DRAWINGS

FIG. 9 is a functional block diagram of client terminals and the server apparatus of an image processing system of a second embodiment.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
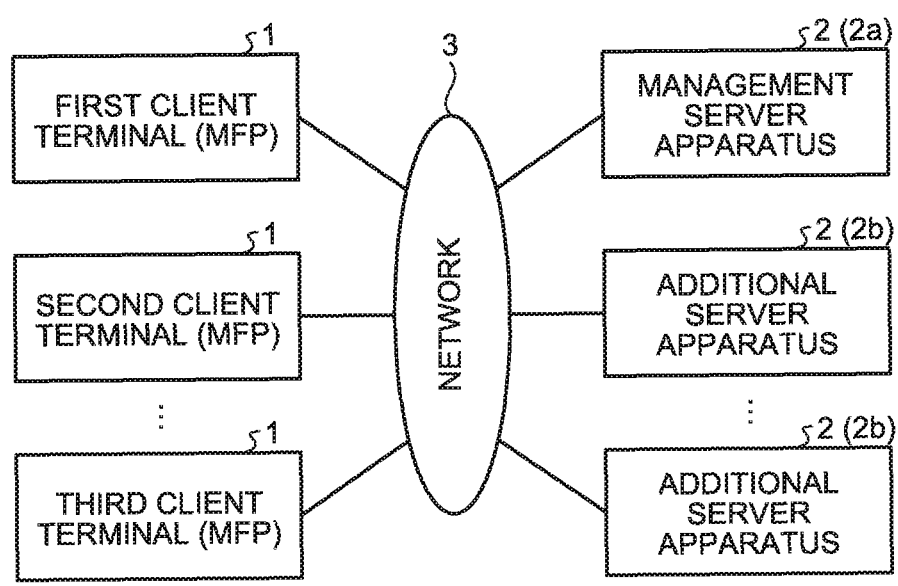
FIG. 1 is a system configuration diagram of an image processing system of a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments of the present invention are described in detail below with reference to the accompanying drawings.

First Embodiment

System Configuration

FIG. 1 illustrates a system configuration diagram of an image processing system of a first embodiment. The image processing system of the first embodiment includes a plurality of client terminals (a first client terminal 1 to an nth client terminal 1 (n is a natural number greater than one)) 1 and one or a plurality of server apparatuses 2. The client terminals 1 and the server apparatuses 2 are mutually connected via a network 3. As the network 3, a LAN (Local Area Network), the Internet, or the like can be used.

As the client terminal 1, a device having a communication function and an information processing function can be used. In this example, an MFP (Multifunction Peripheral) is used as an example of an image processing apparatus having the communication function and the information processing function.

The number of the server apparatuses 2 may be only one. However, in this example, the image processing system includes a single management server apparatus 2a and one or a plurality of additional server apparatuses 2b. The management server apparatus 2a transmits workflow settings, which will be described later, and the like to the client terminal 1. Each of the additional server apparatuses 2b is a server apparatus that can be optionally added to the image processing system of the first embodiment.

Hardware Architecture of Client Terminal

Figure 2:
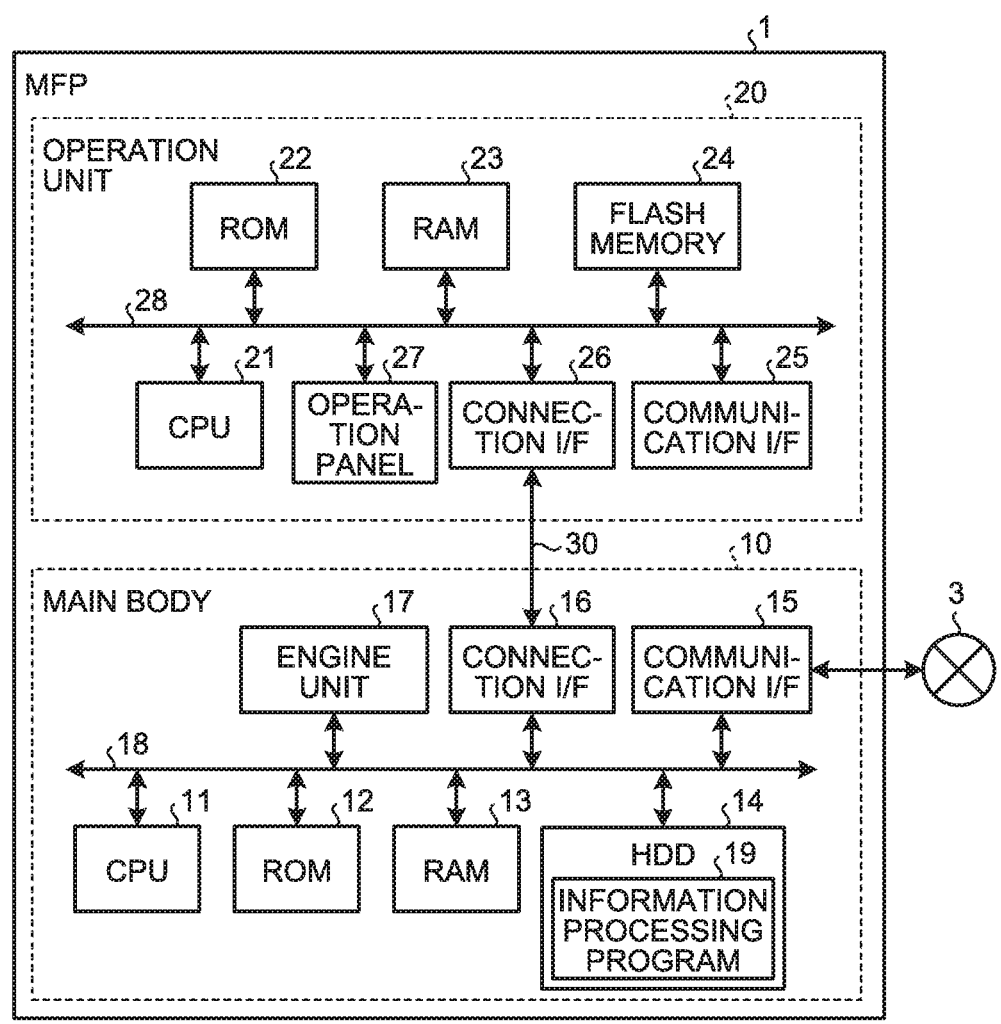
FIG. 2 is a hardware architecture diagram of a client terminal (MFP) included in the image processing system of the first embodiment.

FIG. 2 illustrates a hardware architecture of the client terminal 1. As illustrated in FIG. 2, the client terminal 1 includes a main body 10 having various image forming functions including a copier function, a scanner function, a facsimile function, and a printer function and an operation unit 20 that accepts an input in response to user's operation. The main body 10 and the operation unit 20 are mutually communicably connected via a dedicated communication channel 30. As the communication channel 30, a communication channel compliant with, for example, a USB (Universal Serial Bus) standard may be used. A communication channel compliant with a desired standard, irrespective of wired or wireless, may be used as the communication channel 30. The main body 10 may have either one, or two or more of the image forming functions including the copier function, the scanner function, the facsimile function, and the printer function.

As the operation unit 20, an electronic device capable of accomplishing information processing by itself can be used. For example, as the operation unit 20, an information processing terminal (smart device), such as a smartphone or a tablet computer, can be used. In this case, the smart device employed as the operation unit 20 functions as an operation unit of the client terminal 1.

More specifically, the smart device employed as the operation unit 20 is attachably and detachably connected to the client terminal 1 in place of an operation panel having conventionally been fixedly mounted as an operation unit for dedicated use for the client terminal 1. Specifically, the smart device employed as the operation unit 20 is mounted on the client terminal 1 integrally but detachably (separably) at a predetermined position, which may be the position where the operation panel of the client terminal 1 were to be arranged, for example. Accordingly, the set of the smart device employed as the operation unit 20 and the client terminal 1 may be regarded as a single apparatus. When detached from the client terminal 1, the smart device, i.e., the operation unit 20, performs wireless communication, e.g., that via Bluetooth (registered trademark) or Wi-Fi (registered trademark), or infrared communication, with the client terminal 1, thereby functioning as an operation unit of the client terminal 1. Although the client terminal 1 is configured such that the operation unit 20 is detachable from the main body 10 in this manner, alternatively, the operation unit 20 may be fixed to the main body 10.

The main body 10 performs operations in response to inputs accepted by the operation unit 20. Furthermore, the main body 10 is communicable with an external apparatus, such as the server apparatus 2, and also performs operations in response to instructions received from the external apparatus such as the server apparatus 2.

Hardware Architecture of Main Body

A hardware architecture of the main body 10 is described below. As illustrated in FIG. 1, the main body 10 includes a CPU 11, a ROM 12, a RAM 13, and an HDD (hard disk drive) 14. The main body 10 further includes a communication I/F (interface) 15, a connection I/F 16, and an engine unit 17. The elements denoted by the reference numerals 11 to 17 are mutually connected via a system bus 18.

The CPU 11 performs centralized control of operations of the main body 10. The CPU 11 executes program instructions (hereinafter, "programs") stored in the ROM 12, the HDD 14, or the like while using the RAM 13 as a working area, thereby controlling operations of the entire main body 10 and implementing the above-described various functions including the copier function, the scanner function, the facsimile function, and the printer function.

The HDD 14 stores an information processing program 19 for the client terminal 1. The CPU 11 executes the information processing program 19 for the client terminal 1 stored in the HDD 14, thereby performing a load balancing process that allocates information processing to the client terminal 1 (or the server apparatus 2) that is currently having no load or lightly loaded. The information processing program 19 may alternatively be stored in another storage unit, such as the ROM 12 or the RAM 13, of the main body 10. The information processing program 19 may further alternatively be stored in a storage unit, such as a ROM 22, a RAM 23, or a flash memory 24, of the operation unit 20.

The communication I/F 15 is an interface for communicating with the server apparatuses 2 on the network 3. The connection I/F 16 is an interface for communicating with the operation unit 20 via the communication channel 30. Although the communication channel 30 is illustrated as a wired one in FIG. 2, as described above, the operation unit 20 is configured to be attachable and detachable to and from the main body 10 of the client terminal 1. Accordingly, it should be understood that while when the operation unit 20 is attached to the client terminal 1, the communication channel 30 functions as a wired communication channel, when the operation unit 20 is detached from the client terminal 1, the communication channel 30 functions as a wireless communication channel.

The engine unit 17 is hardware that performs processing, excluding general-purpose information processing and excluding processing for communication, for implementing the copier function, the scanner function, the facsimile function, and the printer function. For example, the engine unit 17 includes a scanner (image reading unit) that reads an image of an original document by scanning, a plotter (image forming unit) that performs printing on a sheet material, such as paper, and a facsimile communication unit that performs facsimile communication. The engine unit 17 may further include a specific optional unit, such as a finisher that sorts out sheets of a printed sheet material or an ADF (automatic document feeding machine) that automatically feeds an original document.

Hardware Architecture of Operation Unit

A hardware architecture of the operation unit 20 is described below. As illustrated in FIG. 1, the operation unit 20 includes a CPU 21, the ROM 22, the RAM 23, the flash memory 24, a communication I/F 25, a connection I/F 26, and an operation panel 27 that are mutually connected via a system bus 28.

The CPU 21 performs centralized control of operations of the operation unit 20. The CPU 21 controls operations of the entire operation unit 20 by executing programs stored in the ROM 22, the flash memory 24, or the like while using the RAM 23 as a working area.

The communication I/F 25 is an interface for communicating with, for example, the server apparatus 2 on the network 3. The connection I/F 26 is an interface for communicating with the main body 10 via the communication channel 30.

The operation panel 27 is embodied as an LCD (liquid crystal display) including a touch sensor. The operation panel 27 accepts various inputs in response to user's operations and displays various types of information including information that depends on an accepted input, information indicating an operational status of the client terminal 1, and information indicating current settings. The operation panel 27 may alternatively be embodied as an organic EL (electroluminescent) display including a touch sensor. The operation panel 27 may include, in addition to or in lieu of the display, an operation unit, such as a hardware key, and an indicator, such as a lamp.

Hardware Architecture of Server Apparatus

Figure 3:
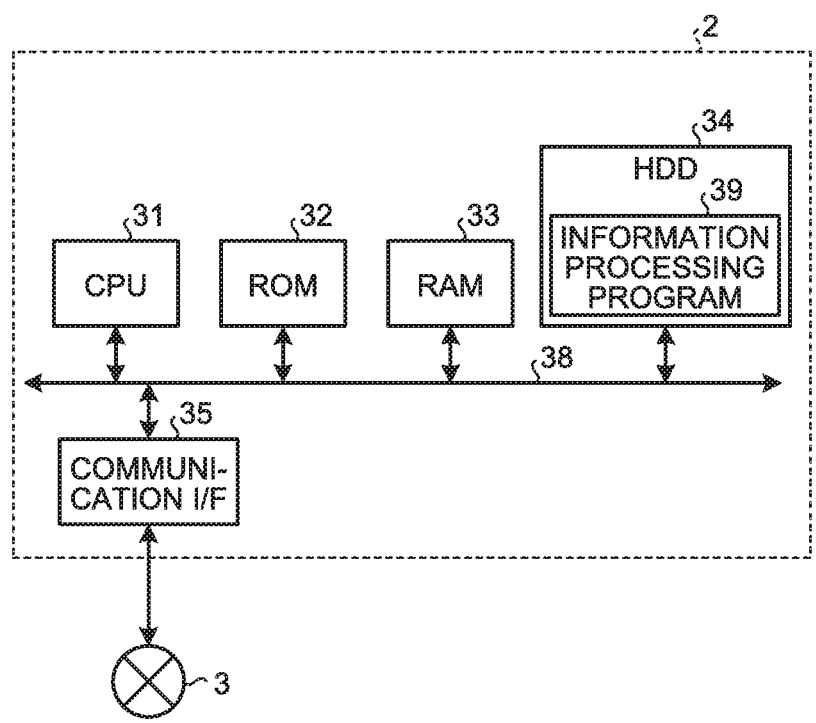
FIG. 3 is a hardware architecture diagram of a server apparatus included in the image processing system of the first embodiment.

FIG. 3 illustrates a hardware architecture diagram of the server apparatus 2 connected to the client terminals 1 configured as described above via the network 3. As illustrated in FIG. 3, the server apparatus 2 includes a CPU 31, a ROM 32, a RAM 33, an HDD 34, and a communication I/F 35. The CPU 31, the ROM 32, the RAM 33, the HDD 34, and the communication I/F 35 are mutually connected via a system bus 38.

The HDD 34 stores an information processing program 39 for the server apparatus 2. The information processing program 39 for the server apparatus 2 may alternatively be stored in another storage unit, such as the ROM 32 or the RAM 33. The CPU 31 executes the information processing program 39 stored in the HDD 34, thereby notifying the client terminals 1 of a current load status and sends information indicating capability(ies) of each of the client terminals 1 to the client terminal 1 that performs the load balancing process. This will be described in detail later.

In the examples of the embodiments, an OS (operating system) of the main body 10 and an OS of the operation unit 20 differ from each other to maintain functional independence. Specifically, the main body 10 and the operation unit 20 operate independently of each other on different operating systems. For example, it is possible to use Linux (registered trademark) as the OS of the main body 10 and use Android (registered trademark) as the OS of the operation unit 20.

When the main body 10 and the operation unit 20 operate on the different operating systems, communication between the main body 10 and the operation unit 20 is performed as communication between different devices rather than inter-process communication within a same device. Examples of this communication include transmitting (command communication) an input (more specifically, an instruction given from a user) accepted by the operation unit 20 to the main body 10 and sending a notification of an event from the main body 10 to the operation unit 20. The operation unit 20 can use the functions of the main body 10 by performing the command communication to the main body 10. Examples of the event, notification of which is transmitted from the main body 10 to the operation unit 20, include a current status of an operation performed on the main body 10 and settings configured on the main body 10.

Functional Blocks of Client Terminal and Server Apparatuses

Figure 5:
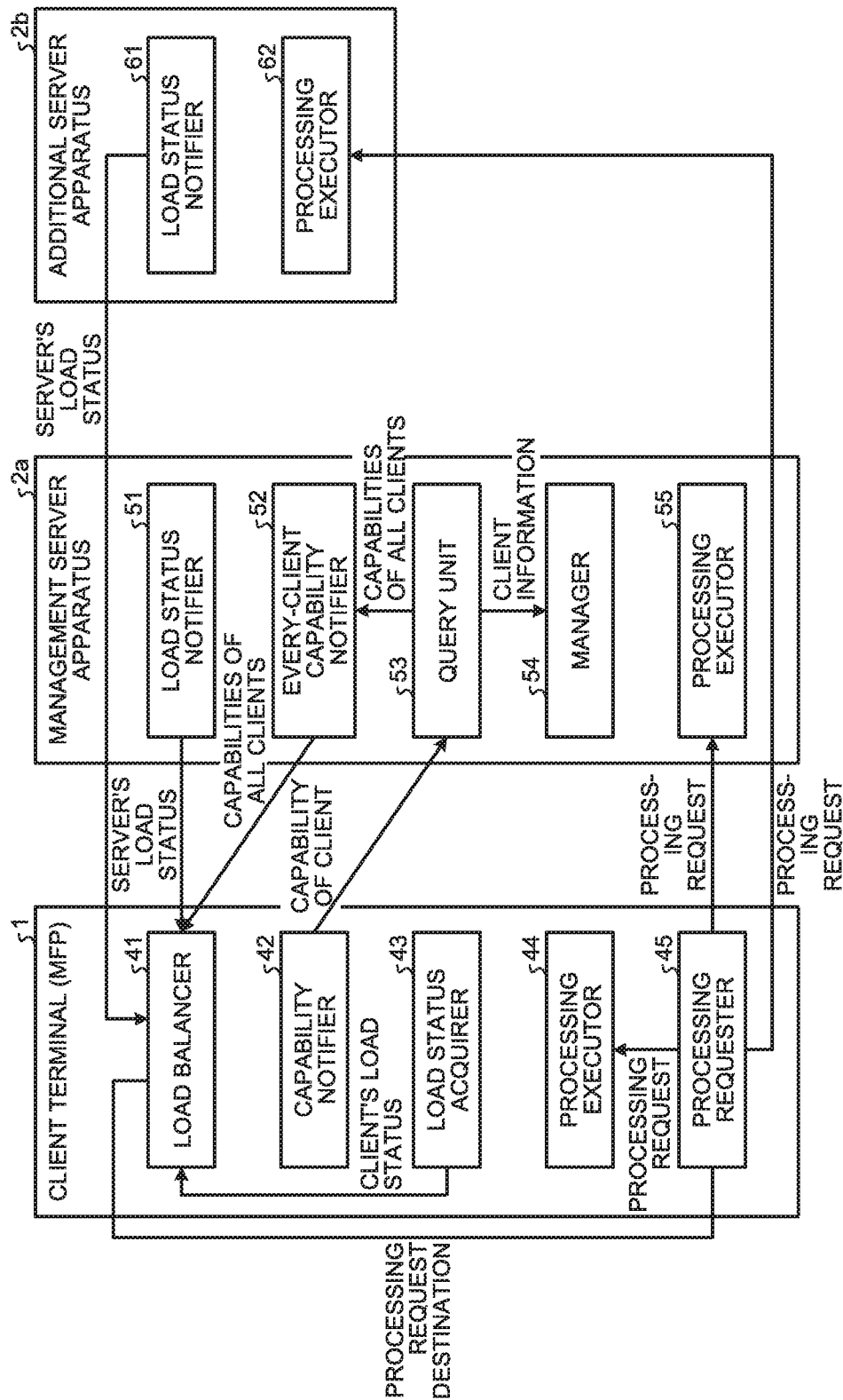
FIG. 5 is a functional block diagram of the client terminal and the server apparatuses of the image processing system of the first embodiment.

FIG. 5 illustrates a functional block of functions implemented by the CPU 11 of the client terminal 1 by executing the information processing program 19 for the client terminal 1 and a functional block of functions implemented by the CPUs 31 of the server apparatuses 2 by executing the information processing program 39 for the server apparatus 2. FIG. 5 illustrates, as the functional blocks of the server apparatuses 2, both of functional blocks of the management server apparatus 2a and functional blocks of the additional server apparatus 2b.

Functions of Client Terminal

Referring to FIG. 5, the CPU 11 of the client terminal 1 executes the information processing program 19 for the client terminal 1, thereby implementing functions of a load balancer 41, a capability notifier 42, a load status acquirer 43, a processing executor 44, and a processing requester 45.

The load balancer 41 is an example of "determiner" and determines the client terminal 1 (or the server apparatus 2) that is to be requested to perform information processing based on capabilities of the other client terminals 1 transmitted from the server apparatus 2 and current load statuses of the server apparatuses 2. The capability notifier 42 notifies the management server apparatus 2a of a processing capability of the client terminal 1 (hereinafter, "own device") to which the capability notifier 42 belongs. Specifically, each of the client terminals 1 stores a "processing capability list" presented below as Table 1 in a storage unit, such as the HDD 14.

TABLE 1

| Example of Item Name | Client ID | Having Capability A | Having Capability B | Having Capability C |
|---|---|---|---|---|
| Example of Item Value | A00001 | True | False | True |

Table 1 indicates an example where client identification information (client ID) of the client terminal 1 is "A00001"; the client terminal 1 has (True) a capability A, which may be, for example, a stapleless binding function; the client terminal 1 does not have (False) a capability B, which may be, for example, a multiple-pages-per-sheet printing function for printing multiple image pages on a single sheet in a combined manner; and the client terminal 1 has (True) a capability C, which may be, for example, a perforation function (punching function). The load balancer 41 determines the client terminal 1 (or the server apparatus 2) to be requested to perform information processing based on the processing capability lists of the other client terminals 1 and the current load statuses of the server apparatuses 2.

The load status acquirer 43 notifies the load balancer 41 of a current load status of the client terminal 1, which is the own device. Specifically, a "load-status decision list" presented below as Table 2 is stored in a storage unit, such as the HDD 14. The load status acquirer 43 constantly detects "CPU Power (CPU utilization ratio (%))", "Memory Utilization Ratio (%)", "Number of Waiting Jobs", and "Size of Job to Be Processed (the size of a job waiting to be processed)" and updates values of corresponding items in the load-status decision list. The load status acquirer 43 acquires the "load-status decision lists" of the client terminal 1, which is the own device, and the other client terminals 1 and sends the load-status decision lists to the load balancer 41.

TABLE 2

| Example of Item Name | CPU Power | Memory Utilization Ratio | Number of Waiting Jobs | Size of Job to Be Processed |
|---|---|---|---|---|
| Example of Item Value | 50% | 50% | 5 | 4 MB |

Table 2 indicates an example where, in the load-status decision list, "50%" is stored as a value for the current CPU Power item; "50%" is stored in as a value for the Memory Utilization Ratio item; "5" is stored as a value for the Number of Waiting Jobs item; "4 MB" is stored as a value for the Size of Job to Be Processed item.

When the items in the load-status decision list include an item whose value exceeds a corresponding threshold value, the load balancer 41 determines that the client terminal 1 is heavily loaded. A user can set threshold values of the items in the load-status decision list as desired on the management server apparatus 2a managing the client terminals 1. The thus-set threshold values are transmitted from the management server apparatus 2a to each of the client terminals 1 by user's operation.

The processing requester 45, which is an example of "requester" transmits a request requesting to perform predetermined information processing (workflow data) to the client terminal 1 (the client terminal 1, which is the own device, or one of the other client terminals 1) or the server apparatus 2 designated by the load balancer 41. The processing executor 44 performs the information processing requested by the client terminal 1.

Figure 4:
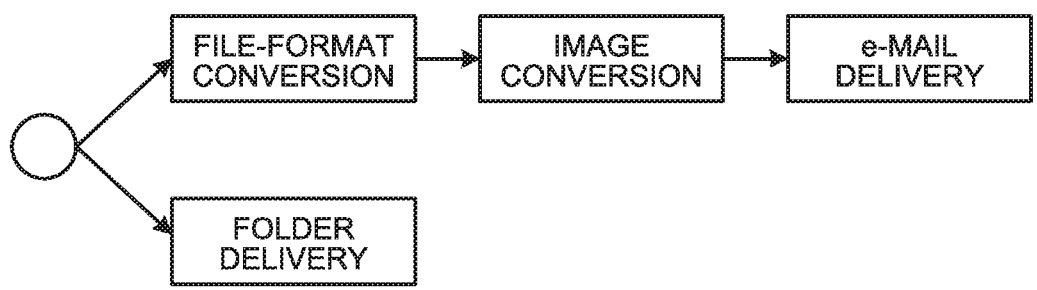
FIG. 4 is a schematic diagram illustrating an example of a workflow.

FIG. 4 illustrates an example of a processing request (workflow data) transmitted from the client terminal 1 to the one of the other client terminals 1 or the server apparatus 2. As illustrated in FIG. 4, the workflow data is information that indicates a sequence of information processing steps. FIG. 4 illustrates an example of workflow data that indicates a method for processing document information read using the scanner function or the like and a method for delivering the document information. Specifically, the workflow data illustrated in FIG. 4 is workflow data for designating that text information obtained by reading a document be processed in the following order: a file-format conversion process, and image conversion process, and an electronic-mail (e-mail) delivery process. The workflow data illustrated in FIG. 4 is also workflow data for designating a folder delivery process that delivers all text information in a folder where text information obtained by reading a document(s) is stored.

Table 3 below is workflow data indicating an order in which plug-ins are used. Table 3 illustrates an example where the workflow data contains list information of plug-ins to be used and information (sequence setting) of the order in which the plug-ins are used. The list information designates a plug-in A, a plug-in B, and a plug-in C as plug-ins to be used. The sequence setting designates that the plug-ins be used in the following order: the plug-in A, the plug-in C, and the plug-in A. Such workflow data as described above is executed by the client terminal 1 or the server apparatus 2.

TABLE 3

| Example of Item Name | Sequence Setting (Order in Which Plug-ins Are Used) | List of Plug-ins to Be Used |
|---|---|---|
| Example of Item Value | plug-in A -> plug-in C -> plug-in B | plug-in A plug-in B plug-in C |

Each of the capability A, the capability B, and the capability C presented in Table 1 described above may alternatively be a processing capability of each processing activity contained in the workflow. For example, in a situation where a capability of converting a scan image from the TIFF format to the JPEG format is necessary for the "FILE-FORMAT CONVERSION" illustrated in FIG. 4, a value for the corresponding capability in Table 1 may be set to "True" when the client terminal 1 is capable of the image-format conversion by using, for example, a plug-in. Similarly, in a situation where predetermined image processing is to be performed in the "IMAGE CONVERSION" illustrated in FIG. 4, a value for the corresponding capability in Table 1 may be set to "True" when the client terminal 1 is capable of this image processing by using, for example, a plug-in.

In short, whether or not the client terminal 1 has a capability can be determined depending on whether or not the client terminal 1 has a plug-in that performs a corresponding processing activity contained in the workflow.

Functions of Management Server Apparatus

Referring to FIG. 5, the CPU 31 of the management server apparatus 2a executes the information processing program 39 for the server apparatus 2, thereby implementing functions of a load status notifier 51, an every-client capability notifier 52, a query unit 53, a manager 54, and a processing executor 55.

The load status notifier 51 detects a current load status of the management server apparatus 2a. This is described specifically below. A "load-status decision list" similar to Table 2 described above is stored in a storage unit, such as the HDD 34, of the management server apparatus 2a. The load status notifier 51 constantly detects "CPU Power", "Memory Utilization Ratio", "Number of Waiting Jobs", and "Size of Job to Be Processed (the size of a job waiting to be processed)" and updates values of corresponding items in the load-status decision list. The load status notifier 51 sends the "load-status decision list" configured as described above to the load balancers 41 of the client terminals 1.

The query unit 53 continuously or intermittently sends an inquiry to all the client terminals 1 connected to the network 3 about a current load status including current "CPU Power", "Memory Utilization Ratio", "Number of Waiting Jobs", "Size of Job to Be Processed (the size of a job waiting to be processed)", and "whether or not the client terminal 1 is being operated by a user (whether or not the client terminal 1 is currently being operated)". The query unit 53 sends information indicating the load statuses collected from the client terminals 1 to the load status notifier 51. The load status notifier 51 generates the above-described "load-status decision lists" corresponding to the load statuses of the client terminals 1 and sends the load-status decision lists to the load balancer 41 of each of the client terminals 1.

The query unit 53 acquires the "processing capability lists (see Table 1)" of all the client terminals 1 connected to the network 3. Table 4 below indicates the processing capability lists of the client terminals 1 acquired by the query unit 53.

TABLE 4

| Example of Item Name | Client ID | Client's Capability |
|---|---|---|
| Example of Item Value | A00001 | client's processing capability list |
| | A00002 | client's processing capability list |
| | A00003 | client's processing capability list |

The query unit 53 stores the processing capability lists acquired from the client terminals 1 in a storage unit, such as the HDD 34. Table 4 illustrates an example where processing capability lists of the client terminals 1 whose client IDs are A00001 to A00003 are acquired. The every-client capability notifier 52 sends (distributes) the processing capability lists of the client terminals 1 acquired by the query unit 53 to the load balancer 41 of each of the client terminals 1. The query unit 53 acquires a "management information list" of all the client terminals 1 connected to the network 3 and stores the management information list in a storage unit, such as the HDD 34. An example of the management information list is presented in Table 5 below.

TABLE 5

| Example of Item Name | Client ID | MAC Address | IP Address | Model |
|---|---|---|---|---|
| Example of Item Value | A00001 | xxxxx | xx.xxx.xx.xxx | A-01 |
| | A00002 | yyyyy | yy.yyy.yy.yyy | B-02 |
| | A00003 | zzzzz | zz.zzz.zz.zzz | A-02 |

For example, the management information list may include information including "client ID", "MAC Address" (Media Access Control Address), "IP Address" (Internet Protocol address), and "Model Name" of the client terminal(s) 1. Table 5 illustrates an example where management information indicating that the MAC address, the IP address, and the model name of the client terminal 1 whose client ID is A00001 is "xxxxx", "xx.xxx.xx.xxx", and "A-01", respectively, is stored. In the example illustrated in Table 5, management information indicating that the MAC address, the IP address, and the model name of the client terminal 1 whose client ID is A00002 is "yyyyy", "yy.yyy.yy.yyy", and "B-02", respectively, is stored. Management information such as that described above is transmitted (distributed) by the manager 54 to all the client terminals 1 and the additional server apparatuses 2b. The client terminal 1 or the like requests one of the other client terminals 1 or the like to perform information processing of workflow data or the like using the management information.

The manager 54 manages load statuses of the management server apparatus 2a and the client terminals 1 based on the "load state decision lists".

The processing executor 55 performs processing requested by the client terminal 1.

Functions of Additional Server Apparatus

Referring to FIG. 5, the CPU 31 of the additional server apparatus 2b executes the information processing program 39 for the server apparatus 2, thereby implementing functions of a load status notifier 61 and a processing executor 62. The load status notifier 61 detects a current load status (see Table 2) of the additional server apparatus 2b and sends the current load status to the load balancers 41 of the client terminals 1. The processing executor 62 performs processing requested by the client terminal 1.

The information processing program 19 for the client terminal 1 and the information processing program 39 for the server apparatus 2 may be provided in a form recorded in a non-transitory computer-readable recording medium, such as a CD-ROM or a flexible disk (FD), as an installable file or an executable file. The information processing program 19, 39 may be provided in a form recorded in a non-transitory computer-readable recording medium, such as a CD-R, a DVD, a Blu-ray Disc (registered trademark), or a semiconductor memory. DVD is an abbreviation of "Digital Versatile Disk". The information processing program 19, 39 may be provided via a network, such as the Internet. The information processing program 19, 39 may be downloaded via a network, installed into the operation unit 20 (or the main body 10), and then executed. The information processing program 19, 39 may be provided in a form loaded into an internal memory, such as a ROM in advance. Some or all of the functions implemented by the information processing program 19, 39 may alternatively be implemented by hardware, such as an IC (semiconductor integrated circuit).

Load Balancing Operation

Conventionally, a request to perform information processing has been issued to the client terminal itself or the server apparatus. By contrast, in the image processing system of the first embodiment, a request to perform information processing is issued to any one of the main client terminal 1, the other client terminals 1, the management server apparatus 2a, and the additional server apparatuses 2b. Thus, the image processing system of the first embodiment distributes processing of entire workflow data, which would otherwise conventionally be processed by a server apparatus, across the client terminals 1, thereby reducing load on the server apparatus 2.

Figure 6:
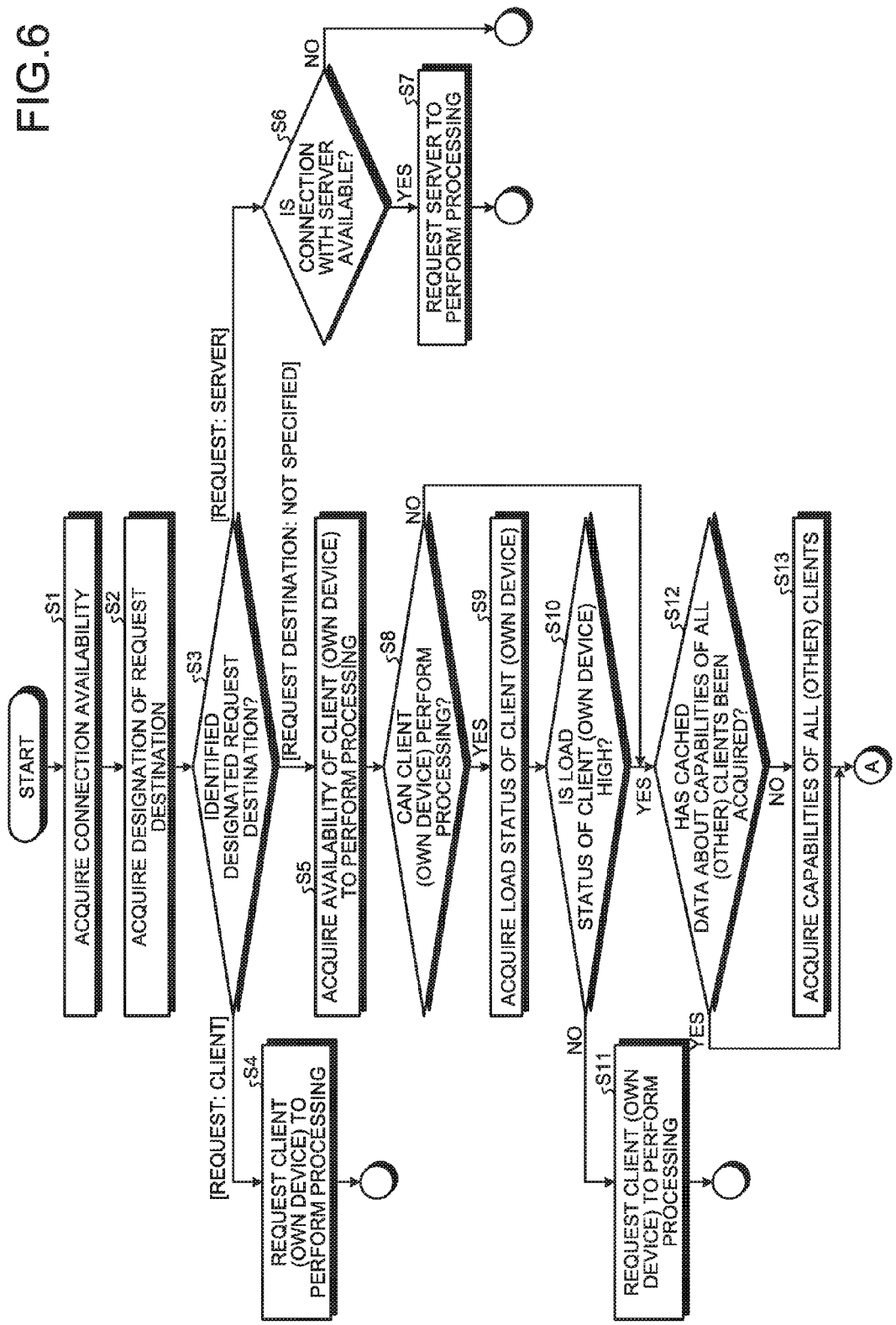
FIG. 6 is a flowchart illustrating the first half of a load balancing operation performed by the client terminal included in the image processing system of the first embodiment.
Figure 7:
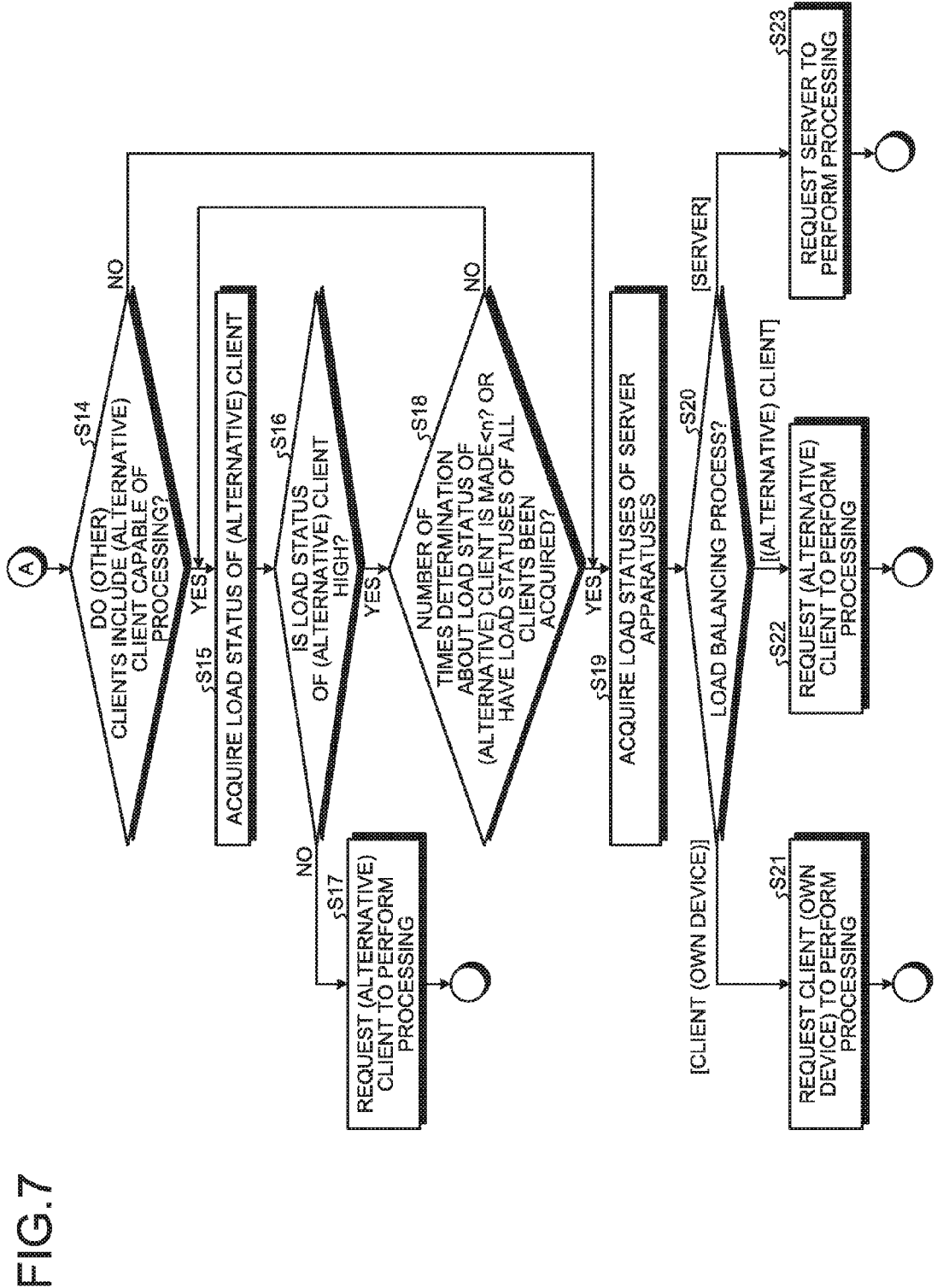
FIG. 7 is a flowchart illustrating the second half of the load balancing operation performed by the client terminal included in the image processing system of the first embodiment.

FIG. 6 and FIG. 7 are flowcharts illustrating a load balancing operation performed by the image processing system of the first embodiment. The flowchart of FIG. 6 illustrates the first half of the load balancing operation. The flowchart of FIG. 7 illustrates the second half of the load balancing operation. At step S1 of the flowchart of FIG. 6, the load balancer 41 of the client terminal 1 communicates with the management server apparatus 2a and the additional server apparatuses 2b to thereby determine whether or not connection with each of the server apparatuses 2 is available and stores connection availability information indicating whether or not the connection is available in a storage unit, such as the HDD 14.

Next, at step S2, the load balancer 41 acquires information indicating a device (request destination) designated for information processing to be performed. Specifically, when it is desirable in terms of security, for example, that the client terminal 1, which is the request source of the to-be-performed information processing, performs the to-be-performed information processing by itself, the request destination of the to-be-performed information processing is set to the request-source client terminal 1. Such settings may preferably be configured by a user of the request-source client terminal 1 by operating the operation unit 20 or by an administrator using the management server apparatus 2a or the like.

Next, at step S3, the load balancer 41 identifies the request designation of the to-be-performed information processing acquired at step S2. When the load balancer 41 identifies that the request designation of the to-be-performed information processing is the client terminal 1, which is the own device, processing proceeds to step S4. At step S4, because the request designation of the to-be-performed information processing is the own device, the load balancer 41 requests the processing requester 45 of the client terminal 1, which is the own device, to perform the to-be-performed information processing. The processing requester 45 requests the processing executor 44 to perform the to-be-performed information processing. Hence, because the to-be-performed information processing can be performed by the client terminal 1, which is the own device, security can be ensured.

When the load balancer 41 identifies that the request designation of the to-be-performed information processing is the server apparatus 2 in the step S3, processing proceeds to step S6. At step S6, the load balancer 41 determines whether or not communication connection with the management server apparatus 2a or the additional server apparatus 2b, which is designated as the request destination, is available based on the connection availability information stored at step S1. When it is determined that communication connection with the server apparatus 2, which is designated as the request destination, is unavailable (No at step S6), processing illustrated in the flowcharts of FIG. 6 and FIG. 7 ends.

On the other hand, when it is determined that communication connection with the server apparatus 2, which is designated as the request destination, is available (Yes at step S6), processing proceeds to step S7. At step S7, the load balancer 41 sends a notification indicating the server apparatus 2 designated as the processing request destination to the processing requester 45. The processing requester 45 issues a processing request to the management server apparatus 2a or the additional server apparatus 2b designated as the processing request destination by transmitting information to be processed via the communication I/F 15. Hence, the designated server apparatus 2 can perform the to-be-performed information processing.

At step S3, when the load balancer 41 identifies that the request designation of the to-be-performed information processing is not designated (not specified), processing proceeds to S5. At step S5, the load balancer 41 acquires information, based on which whether or not the client terminal 1, which is the own device, can perform the to-be-performed information processing can be determined. Specifically, the load balancer 41 acquires information indicating information processing capability of the own device from the capability notifier 42 of the own device. At step S6, the load balancer 41 determines whether or not the own device can perform the to-be-performed information processing based on the acquired information indicating the information processing capability of the own device. When the load balancer 41 determines that the own device can perform the to-be-performed information processing (Yes at step S8), processing proceeds to step S9. On the other hand, when the load balancer 41 determines that the own device cannot perform the to-be-performed information processing due to lack of a function for performing the to-be-performed information processing (No at step S8), processing of the flowchart of FIG. 6 proceeds to step S12 to assign the processing to another one of the client terminals 1.

When processing proceeds to step S9 because it is determined that the own device can perform the to-be-performed information processing, the load balancer 41 acquires the load-status decision list (see Table 2) indicating a current load status of the own device from the load status acquirer 43. At step S10, the load balancer 41 determines whether or not the current load of the own device is high. When the items "CPU Power", "Memory Utilization Ratio", "Number of Waiting Jobs", and "Size of Job to Be Processed" described above with reference to Table 2 include an item whose value is equal to or higher than its corresponding predetermined threshold value, the load balancer 41 determines that the current load of the own device is "high" (Yes at step S10), and causes processing to proceed to S12. On the other hand, when the value of each of the above-described items is lower than its corresponding predetermined threshold value, the load balancer 41 determines that the current load of the own device is "low" (No at step S10), and causes processing to proceed to step S11.

In this example, it is determined that the load status of the own device is "high" when the above-described items include one or more items whose values are each equal to or higher than its corresponding predetermined threshold value. Alternatively, it may be determined that the load status of the own device is "high" when the items include a plurality of items whose values are each equal to or higher than its corresponding predetermined threshold value.

For example, the threshold values of the items, based on which the load status is to be determined, may be set on the management server apparatus 2*a* that manages the client terminals 1. The threshold values may alternatively be set by a user of the client terminal 1 by operating the client terminal 1. The thus-set threshold values are transmitted (distributed) from the management server apparatus 2*a* to each of the client terminals 1.

When the load balancer 41 determines that the current load of the own device is "low" and causes processing to proceed to step S11, the load balancer 41 notifies the processing requester 45 of the own device that the device (the processing request destination) that is to perform the to-be-performed information processing is the own device. The processing requester 45 of the own device requests the processing executor 44 of the own device to perform the to-be-performed information processing. Thus, when lightly loaded, the client terminal 1, which is the own device, can perform the to-be-performed information processing.

On the other hand, when the load balancer 41 determines that the current load status of the own device is "high" and causes processing to proceed to S12, the load balancer 41 determines whether or not the processing capability lists (see Table 4) of the other client terminals 1 have already been acquired.

Specifically, the every-client capability notifier 52 of the management server apparatus 2*a* communicates with all the client terminals 1 and all the server apparatuses 2 (including the management server apparatus 2*a*) connected to the network 3, thereby acquiring information indicating information processing capabilities and generates the processing capability lists described with reference to Table 4 in a storage unit, such as the HDD 34. The every-client capability notifier 52 transmits the processing capability lists to the load balancer 41 at predetermined time intervals. The every-client capability notifier 52 may alternatively transmit the processing capability lists to the load balancer 41 upon receiving a request to transmit the processing capability lists from the load balancer 41.

Upon receiving the processing capability lists from the every-client capability notifier 52 of the management server apparatus 2*a*, the load balancer 41 stores the processing capability lists in a storage unit, such as the HDD 14. The load balancer 41 determines whether or not the processing capability lists are stored in the HDD 14 at step S12, thereby determining whether or not the processing capability lists (cached data (see Table 4)) of all client devices (the other client terminals 1 and the server apparatuses 2) have already been acquired. When it is determined that the processing capability lists of all the client devices have already been acquired (Yes at step S12), processing proceeds to step S14 of the flowchart of FIG. 7.

On the other hand, when it is determined that the processing capability lists of all the client devices have not been acquired yet (No at step S12), the load balancer 41 causes processing to proceed to step S13 and requests the management server apparatus 2*a* for the processing capability lists of all the client devices (the other client terminals 1 and the server apparatuses 2) via the communication I/F 15. Upon receiving the processing capability lists of all the client devices from the management server apparatus 2*a*, the load balancer 41 stores the processing capability lists in the HDD 14 or the like and causes processing to proceed to step S14 of the flowchart of FIG. 7.

Next, when processing proceeds to step S14 of the flowchart of FIG. 7, determination as to whether or not the other client terminals 1 include one (hereinafter, "the alternative client terminal 1") having the capability to perform the to-be-performed information processing is made using the above-described processing capability lists stored in the HDD 14. When it is determined that the other client terminals 1 include the alternative client terminal 1 having the capability to perform the to-be-performed information processing (Yes at step S14), processing proceeds to step S15. On the other hand, when it is determined that the other client terminals 1 do not include the alternative client terminal 1 having the capability to perform the to-be-performed information processing (No at step S14), processing proceeds to step S19.

When processing proceeds to S15 because it is determined that the other client terminals 1 include the alternative client terminal 1 having the capability to perform the to-be-performed information processing, the load balancer 41 detects IP address of the alternative client terminal 1 having the capability to perform the to-be-performed information processing using the management information list stored in the HDD 14. The load balancer 41 accesses the alternative client terminal 1 having the capability to perform the to-be-performed information processing using the detected IP address and acquires the load-status decision list (see Table 2) of the alternative client terminal 1. At step S16, the load balancer 41 determines whether or not the current load status of the alternative client terminal 1 having the capability to perform the to-be-performed information processing is high using the load-status decision list.

Specifically, when values of the items including "CPU Power", "Memory Utilization Ratio", "Number of Waiting Jobs", and "Size of Job to Be Processed" presented in Table 2 do not include a value that is equal to or higher than its corresponding predetermined threshold value, the load balancer 41 determines that the current load status of the alternative client terminal 1 having the capability to perform the to-be-performed information processing is low (No at step S16), and causes processing to proceed to step S17. At step S17, the load balancer 41 sends a notification that the alternative client terminal 1 whose current load status is low is the client terminal 1 that is to perform the to-be-performed information processing to the processing executor 44 via the processing requester 45. The processing executor 44 issues a processing request to the alternative client terminal 1, notification of which is received, by transmitting information to be processed to the alternative client terminal 1 via the communication I/F 15. Thus, it is possible to cause the alternative client terminal 1 whose current load status is low to perform the to-be-performed information processing in lieu of the management server apparatus 2a or the additional server apparatus 2b whose current load status is high.

Although the request to perform the to-be-performed information processing is issued to the alternative client terminal 1 having the capability to perform the to-be-performed information processing in this example, alternatively, the request to perform the to-be-performed information processing may be issued to the management server apparatus 2a or the additional server apparatus 2b whose current load status is low. An advantage similar to that obtained from the above-described example can be obtained also in this case.

When values of the items including "CPU Power", "Memory Utilization Ratio", "Number of Waiting Jobs", and "Size of Job to Be Processed" include one or more values equal to or higher than its corresponding predetermined threshold value, the load balancer 41 determines that the current load status of the alternative client terminal 1 having the capability to perform the to-be-performed information processing is high (Yes at step S16), and causes processing to proceed to step S18.

At step S16, the load balancer 41 determines that the alternative client terminal 1 having the capability to perform the to-be-performed information processing is currently "being operated" when the alternative client terminal 1 is in the state described below. Upon determining that the alternative client terminal 1 is being operated, the load balancer 41 determines that the alternative client terminal 1 is currently heavily loaded, and causes processing to proceed to step S18.

Specifically, in the image processing system of the first embodiment, the CPU 21 (and the CPU 11) of each of the client terminals 1 (and the server apparatuses 2) functions as a display control unit that displays an operation menu, a screen in response to a user's input operation, and the like on the operation panel 27. Accordingly, the CPU 21 can determine whether or not the client terminal 1 is currently being operated based on the screen being displayed. For example, when a predetermined screen (e.g., a workflow selection screen or a workflow setting screen) of an application program related to a workflow is displayed, the CPU 21 determines that the client terminal 1 is currently being operated, but determines that the client terminal 1 is not currently being operated when a screen (e.g., a login screen) other than the predetermined screen is displayed.

When it is determined that the client terminal 1 is currently being operated, the CPU 11 stores operation information, e.g., "True", indicating that the client terminal 1 is being operated in a storage unit, such as the RAM 23. When it is determined that the client terminal 1 is not currently being operated, the CPU 11 stores operation information, e.g., "False", indicating that the client terminal 1 is not being operated in the storage unit, such as the RAM 23. When an operational status changes, the CPU 11 updates the above-described operation information stored in the RAM 23.

The load balancer 41 of the client terminal 1 that assigns the to-be-performed information processing acquires the above-described operation information from the above-described alternative client terminals 1 together with the load-status decision list. The load balancer 41 functions as an example of "determiner" such that, when the operation information indicates "True", the load balancer 41 determines that the alternative client terminal 1 is currently being operated and therefore the load status of the alternative client terminal 1 is high, and causes processing to proceed to step S18. On the other hand, when the operation information indicates "False", the load balancer 41 determines that the alternative client terminal 1 is not currently being operated and therefore the load status of the alternative client terminal 1 is low, and causes processing to proceed to step S17 described above.

Next, when processing proceeds to step S18 because it is determined that the current load status of the alternative client terminal 1 is high, whether or not the number of times determination about the load status of the alternative client terminal 1 is made is smaller than n, which is a predetermined number, or whether or not the load statuses of all of the other client terminals 1 have been acquired is determined.

Specifically, the image processing system of the first embodiment is configured such that when the load status of the alternative client terminal 1 is high, processing goes back from step S18 to step S15 to search for another currently-lightly-loaded one of the client terminals 1 having the processing capability. The number of times this search is repeated is denoted by "n" described above. The number, n, of the times the search is repeated can be set by a user to any desired number, e.g., three or five.

Next, when the number of times the search for the lightly-loaded client terminal 1 is repeated has become equal to or larger than the above-described number "n" (Yes at S18) or when it is determined at step S14 that the other client terminals 1 do not include the alternative client terminal 1 capable of processing the to-be-processed information, processing proceeds to S19. At step S19, the load balancer 41 acquires, from the load status notifier 51 of the management server apparatus 2a and the load status notifiers 61 of the additional server apparatuses 2b, the load-status decision lists indicating current load statuses.

Next, at step S20, the load balancer 41 performs the load balancing process of selecting a device, to which the to-be-performed information processing is to be assigned, based on "the processing capability and the load status of the own device", "the processing capability and the load status (including the operational status) of each of the other client terminals 1, and "the processing capability and the load status" of each of the server apparatuses 2. When the load statuses of the client terminals 1 are similar to each other, the load balancer 41 may preferably determine the request destination of the to-be-processed processing with higher priority given to the client apparatuses 1 to thereby reduce load on the server apparatus 2.

When the to-be-performed information processing is to be performed by the client terminal 1, which is the own device, the load balancer 41 notifies the processing requester 45 of the own device that the request destination of the to-be-performed information processing is the own device. In response thereto, at step S21, the processing executer 44 of the client terminal 1, which is the own device, performs the to-be-performed information processing.

When the to-be-performed information processing is to be performed by the alternative client terminal 1, the load balancer 41 notifies the processing requester 45 of the own device that the request destination of the to-be-performed information processing is the alternative client terminal 1. In response thereto, at step S22, the processing executer 44 of the client terminal 1, which is the alternative client terminal 1 having the processing capability and currently being in a light load status, performs the to-be-performed information processing.

When none of the other client terminals 1 is detected as being in a light load status, the load balancer 41 requests one of the server apparatuses 2 to perform the to-be-performed information processing. The load balancer 41 notifies the processing requester 45 of the own device that the request destination of the to-be-performed information processing is the server apparatus 2, thereby requesting the server apparatus 2 (the management server apparatus 2a or the additional server apparatus 2b) to perform the to-be-performed information processing. In response thereto, at step S23, the processing executer 55 of the server apparatus 2 having the processing capability and currently being in a light load status performs the to-be-performed information processing.

Advantages of First Embodiment

As is apparent from the above description, the image processing system of the first embodiment includes, in addition to the server apparatus 2 that performs information processing, the plurality of client terminals 1. The image processing system performs the load balancing of detecting information processing capabilities and current load statuses of the client terminals 1 and assigning to-be-performed information processing to the client terminal 1 having a corresponding processing capability and currently being in a light load status.

Figure 8:
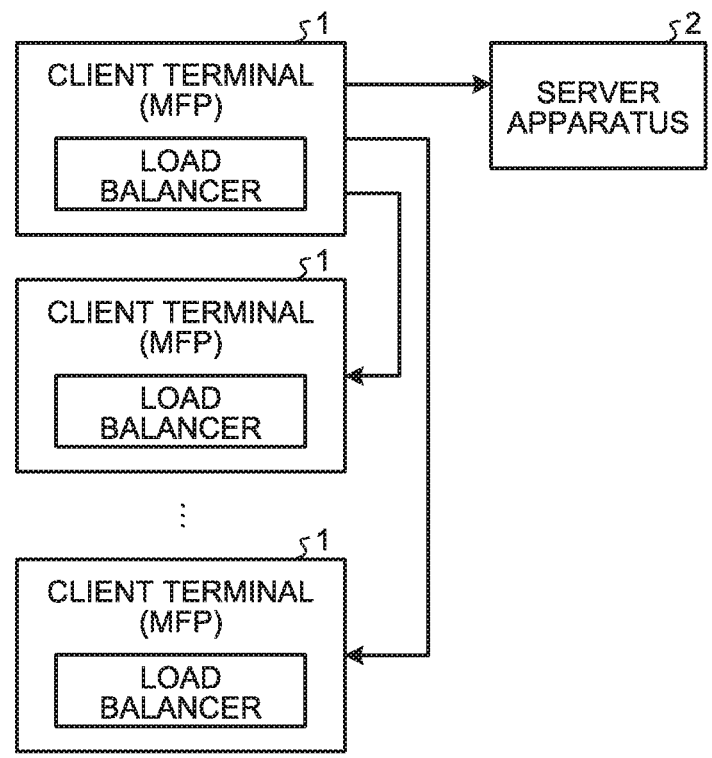
FIG. 8 is a schematic diagram for describing the load balancing operation in the image processing system of the first embodiment.

As a result, as illustrated in FIG. 8, the to-be-performed information processing can be allocated to the client terminal 1, which is lightly-loaded one of the other client terminals 1, thereby reducing load on the server apparatus 2. Furthermore, because information processing of the server apparatus 2 can be shared by the client terminals 1, the need for adding the server apparatus 2 can be reduced. Furthermore, because to-be-performed information processing can be shared by the client terminals 1, the image processing system, in its entirety, is capable of performing to-be-performed information processing even during a period when the server apparatus 2 is suspended.

The image processing system of the first embodiment regards the client terminal 1 that is being operated by a user as the client terminal 1 whose current load status is high and does not assign to-be-performed information processing to the client terminal 1. Thus, an inconvenient decrease in responsiveness of the client terminal 1 that would otherwise occur if to-be-performed information processing is assigned to the client terminal 1 can be prevented.

Second Embodiment

An image processing system of a second embodiment is described below. The image processing system of the first embodiment described above assigns processing to the alternative client terminal 1 or the like on a per-to-be-performed workflow basis. By contrast, the image processing system of the second embodiment assigns processing to the alternative client terminal 1 or the like on a per-processing-activity basis, where processing activities are contained in a workflow to be performed. The second embodiment described below differs from the first embodiment described above only in this respect. Therefore, only what makes the second embodiment different from the first embodiment is described below, and repeated description is omitted.

FIG. 9 illustrates a functional block diagram of functions implemented by executing an information processing program for a client terminal 1a, which is a request source of to-be-performed information processing, a functional block of functions implemented by executing the information processing program 39 for the management server apparatus 2a, and a functional block of functions implemented by executing an information processing program for another client terminal 1b. As illustrated in FIG. 9, in each of the request-source client terminal 1a and the other client terminal 1b, the load balancer 41 includes a server query unit 71, a request-destination decider (load-status deciding unit) 72, and an other-client query unit 73.

In the image processing system of the second embodiment configured as described above, the request-destination decider 72 of the load balancer 41 of the request-source client terminal 1a acquires the server's load status from the management server apparatus 2a via the server query unit 71 and processing capability lists (see Table 1) of all the client terminals 1a and 1b. Furthermore, the request-destination decider 72 detects the client terminals 1a and 1b (which can be the own device) having capability to perform to-be-processed processing based on processing capabilities of all the client terminals 1a and 1b. For each processing activity contained in a workflow, the request-destination decider 72 queries each of the client terminals 1a and 1b (which can be the own device) having capability to perform the to-be-processed processing activity and the server apparatuses 2 (the management server apparatus 2a and the additional server apparatuses 2b) for a current load status and assigns the to-be-processed processing activity to the client terminal 1 or the server apparatus 2 that is currently lightly loaded.

Specifically, the request-destination decider 72 waits until a processing activity contained in the workflow is completed by the client terminal 1 or the like, to which the processing activity is assigned, and thereafter assigns the next processing activity contained in the workflow. Put another way, the request-destination decider 72 assigns the processing in synchronization with each of processing activities contained in the workflow.

As a result, to-be-performed information processing can be assigned to the client terminal 1 or the server apparatus 2 that is currently lightly loaded in a subdivided manner on a per-processing-activity basis, where processing activities are contained in a workflow. In addition, the same advantages as those provided by the first embodiment described above can be obtained.

According to an aspect of the present invention, load on a server apparatus to which information processing can be allocated can be reduced.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing system comprising:
    a plurality of image forming apparatuses; and
    at least one server apparatus, the image forming apparatuses and the server apparatus being mutually connected via a network, the server apparatus being configured to manage load statuses of the plurality of image forming apparatuses,
    each of the image forming apparatuses including a processor configured to
    upon determining that information processing is not to be performed by the image forming apparatus to which the processor belongs based on a load status of the image forming apparatus to which the processor belongs, determine whether or not the other image forming apparatuses include an alternative image forming apparatus capable of performing the information processing based on load statuses of other image forming apparatuses of the plurality of image forming apparatuses acquired from the server apparatus, and
    when the other image forming apparatuses include the alternative image forming apparatus capable of performing the information processing, request the alternative image forming apparatus to perform the information processing, but when the other image forming apparatuses do not include the alternative image forming apparatus capable of performing the information processing, request the server apparatus to perform the information processing.

2. The image processing system according to claim 1, wherein
    the processor determines whether or not the other image forming apparatuses include the alternative image forming apparatus capable of performing the information processing based on load statuses and information processing capabilities of the other image forming apparatuses acquired from the server apparatus.

3. The image processing system according to claim 1, wherein
    the processor determines the alternative image forming apparatus capable of performing the information processing based on at least any one of a number of jobs waiting, a size of a job waiting to be processed, and an operation status of each of the other image forming apparatuses.

4. The image processing system according to claim 1, wherein
    the processor issues a request requesting to perform the information processing on a per-workflow-data basis, where workflow data contains one or a plurality of information processing activities.

5. The image processing system according to claim 1, wherein
    the processor issues a request requesting to perform the information processing on a per-information-processing-activity basis, where workflow data contains one or a plurality of information processing activities.

6. The image processing system according to claim 5, wherein
    after completion of one information processing activity, the processor issues a request requesting to perform a next information processing activity.

7. An image processing method for an image processing system including a plurality of image forming apparatuses and at least one server apparatus, the image forming apparatuses and the server apparatus being mutually connected via a network, the image processing method comprising:
    determining, by a processor of an image forming apparatus of the plurality of image forming apparatuses, upon determining that information processing is not to be performed by the image forming apparatus to which the processor belongs based on a load status of the image forming apparatus to which the processor belongs, whether or not other image forming apparatuses of the plurality of image forming apparatuses include an alternative image forming apparatus capable of performing the information processing based on load statuses of the other image forming apparatuses acquired from the server apparatus; and
    requesting, by a processor of the image forming apparatus, when the other image forming apparatuses include the alternative image forming apparatus capable of performing the information processing, the alternative image forming apparatus to perform the information processing, but when the other image forming apparatuses do not include the alternative image forming apparatus capable of performing the information processing, requesting the server apparatus to perform the information processing.

8. The image processing method according to claim 7, wherein
    the determining determines whether or not the other image forming apparatuses include the alternative mage forming apparatus capable of performing the information processing based on load statuses and information processing capabilities of the other image forming apparatuses acquired from the server apparatus.

9. The image processing method according to claim 7, wherein the determining determines the alternative image forming apparatus capable of performing the information processing based on at least any one of a number of jobs waiting, a size of a job waiting to be processed, and an operation status of each of the other image forming apparatuses.

10. The image processing method according to claim 7, wherein
the requesting issues a request requesting to perform the information processing on a per-workflow-data basis, where workflow data contains one or a plurality of information processing activities.

11. The image processing method according to claim 7, wherein
the requesting issues a request requesting to perform the information processing on a per-information-processing-activity basis, where workflow data contains one or a plurality of information processing activities.

12. The image processing method according to claim 11, wherein
after completion of one information processing activity, the requesting issues a request requesting to perform a next information processing activity.

13. An image forming apparatus comprising
a processor configured to,
upon determining that information processing is not to be performed by the image forming apparatus based on a load status of the image forming apparatus, determine whether or not other image forming apparatuses on a network include an alternative image forming apparatus capable of performing the information processing based on load statues of the other image forming apparatuses acquired from a server apparatus via the network; and
when the other image forming apparatuses include the alternative image forming apparatus capable of performing the information processing, request the alternative image forming apparatus to perform the information processing, but when the other image forming apparatuses do not include the alternative image forming apparatus capable of performing the information processing, request the server apparatus to perform the information processing.

14. The image forming apparatus according to claim 13, wherein
the processor determines whether or not the other image forming apparatuses include the alternative image forming apparatus capable of performing the information processing based on load statuses and information processing capabilities of the other image forming apparatuses acquired from the server apparatus.

15. The image forming apparatus according to claim 13, wherein
the processor determines the alternative image forming apparatus capable of performing the information processing based on at least any one of a number of jobs waiting, a size of a job waiting to be processed, and an operation status of each of the other image forming apparatuses.

16. The image forming apparatus according to claim 13, wherein
the processor issues a request requesting to perform the information processing on a per-workflow-data basis, where workflow data contains one or a plurality of information processing activities.

17. The image forming apparatus according to claim 13, wherein
the processor issues a request requesting to perform the information processing on a per-information-processing activity basis, where workflow data contains one or a plurality of information processing activities.

18. The image forming apparatus according to claim 17, wherein
after completion of one information processing activity, the processor issues a request requesting to perform a next information processing activity.

* * * * *